United States Patent
Lauffer et al.

(10) Patent No.: US 12,030,444 B2
(45) Date of Patent: Jul. 9, 2024

(54) SELECTIVE ACTUATION OF VEHICLE COMPONENTS USING TWO CONTROL MODULES

(71) Applicant: Ford Global Technologies, LLC, Dearborn, MI (US)

(72) Inventors: Scott J. Lauffer, Northville, MI (US); Seema Gami, Novi, MI (US); Michael Alan Mcnees, Flat Rock, MI (US); Ali Delbari, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 449 days.

(21) Appl. No.: 17/352,882

(22) Filed: Jun. 21, 2021

(65) Prior Publication Data

US 2022/0402448 A1   Dec. 22, 2022

(51) Int. Cl.
| | | |
|---|---|---|
| *B60R 16/023* | (2006.01) | |
| *B60K 20/02* | (2006.01) | |
| *B60K 26/02* | (2006.01) | |
| *B60R 16/03* | (2006.01) | |
| *B60T 7/04* | (2006.01) | |
| *G05G 1/40* | (2008.04) | |

(52) U.S. Cl.
CPC ......... *B60R 16/0231* (2013.01); *B60K 26/02* (2013.01); *B60R 16/03* (2013.01); *B60T 7/04* (2013.01); *B60K 20/02* (2013.01); *B60K 2026/026* (2013.01); *G05G 1/40* (2013.01)

(58) Field of Classification Search
CPC ... B60R 16/0231; B60R 16/03; B60R 16/023; B60K 26/02; B60K 20/02; B60K 2026/026; B60K 2023/025; B60K 23/02; B60T 7/04; B60T 7/18; B60T 2210/36; B60T 2220/04; B60T 17/22; B60T 7/042; B60T 7/06; G05G 1/40; B60Y 2400/3015; B60Y 2400/3017; B60Y 2400/40

See application file for complete search history.

(56) References Cited

U.S. PATENT DOCUMENTS

| | | | | |
|---|---|---|---|---|
| 4,949,820 | A | * | 8/1990 | Fontaine ............... B60T 11/103 477/197 |
| 7,243,630 | B2 | * | 7/2007 | Boe ........................ B60W 10/06 290/38 E |
| 10,391,886 | B2 | | 8/2019 | Wortberg et al. |

(Continued)

FOREIGN PATENT DOCUMENTS

| | | |
|---|---|---|
| CN | 110682876 A | 1/2020 |
| WO | 2016162624 A1 | 10/2016 |

*Primary Examiner* — Abby Y Lin
*Assistant Examiner* — Dylan Brandon Mooney
(74) *Attorney, Agent, or Firm* — Frank A. MacKenzie; Bejin Bieneman PLC (57) ABSTRACT

A system comprises a first control module that meets specified operational criteria for controlling a component of a vehicle and a second control module that meets specified operational criteria for actuating the component. The first control module is arranged to send a first signal to open a relay that, when closed, electrically couples a power output of the second control module to ground via a fuse, send a second signal to cause the second control module to power a motor for actuating the component, receive a third signal indicating a completion of actuation of the component, and responsive to receiving the third signal, send a fourth signal to close the relay.

20 Claims, 5 Drawing Sheets

(56) References Cited

U.S. PATENT DOCUMENTS

| | | | |
|---|---|---|---|
| 2008/0034914 A1* | 2/2008 | Hwang | G05G 5/06 74/529 |
| 2009/0025501 A1* | 1/2009 | Mitteer | F16H 61/22 74/473.12 |
| 2015/0112510 A1* | 4/2015 | Tokunaga | G06F 1/3206 701/1 |
| 2019/0143965 A1* | 5/2019 | Driscoll | G05D 1/0038 701/41 |
| 2020/0223383 A1 | 7/2020 | Awad Alla et al. | |
| 2020/0317167 A1* | 10/2020 | Ghaffari | G05D 1/0061 |
| 2021/0318710 A1* | 10/2021 | Miletto | B60K 26/02 |

* cited by examiner

SELECTIVE ACTUATION OF VEHICLE COMPONENTS USING TWO CONTROL MODULES

BACKGROUND

During normal operation of a modern vehicle, such as an automobile, electronic control modules may control various components of the vehicle. Some vehicle components may need to be actuated in conjunction with operation/usage of various features of the vehicle. A motor can be arranged to actuate a given component when powered, and a control module can be arranged to power the motor when actuation of the component is desired.

DETAILED DESCRIPTION

Disclosed herein are techniques for-actuation of vehicle components using two control modules. According to such techniques, actuation of a vehicle component that is to be controlled by a control module A i.e., electronic control module or electronic control unit (ECM or ECU), can be administered by a control module. Control Module A can be arranged to selectively operate a switch so as to enable Control Module B to actuate the component when instructed to do so by Control Module A, while preventing Control Module B from actuating the component otherwise. The architecture can significantly be enhanced by having Control Module A as the controlling node and Control Module B as actuating component (Where Control Module A can control several functions as the computing node). Additionally, having the option of component actuation using Control Module B can yield increased flexibility with respect to vehicle design and manufacture.

A system can comprise of Control Module A with specified operational criteria for controlling a component of a vehicle and a Control Module B that is operationally used for actuation purposes. The first control module can be arranged to send a first signal to open a relay that, when closed, electrically couples a power output of the second control module to ground via a fuse, send a second signal to cause the second control module to power a motor for actuating the component, receive a third signal indicating a completion of actuation of the component, and responsive to receiving the third signal, send a fourth signal to close the relay.

The first control module can be arranged to wait for a defined amount of time after sending the first signal before sending the second signal.

The relay can be a normally-closed relay.
The component can comprise a retractable pedal.
Actuating the component can cause the retractable pedal to move from a retracted position to a non-retracted position.
Actuating the component can cause the retractable pedal to move from a non-retracted position to a retracted position.
The retractable pedal can be a brake pedal.
The retractable pedal can be an accelerator pedal.
The retractable pedal can be a clutch pedal.
The component can comprise an emergency brake or parking brake of the vehicle.

A method can comprise sending, from a first control module of a vehicle, a first signal to open a relay, wherein Control Module A module is has operational criteria for control, sending, from the first control module, a second signal to cause a second control module of the vehicle to power a motor for actuating the component, Control Module B has operational criteria for controlling the component, receiving, from the second control module, a third signal indicating a completion of actuation of the component, and responsive to receiving the third signal, sending, from the first control module, a fourth signal to close the relay, wherein closing the relay completes a circuit electrically coupling a power output of the second control module to ground via a fuse.

The method can comprise waiting for a defined amount of time after sending the first signal before sending the second signal.

The relay can be a normally-closed relay.
The component can comprise a retractable pedal.
Actuating the component can cause the retractable pedal to move from a retracted position to a non-retracted position.
Actuating the component can cause the retractable pedal to move from a non-retracted position to a retracted position.
The retractable pedal can be a brake pedal.
The retractable pedal can be an accelerator pedal.
The retractable pedal can be a clutch pedal.
The component can comprise an emergency brake or parking brake of the vehicle.

Figure 1:
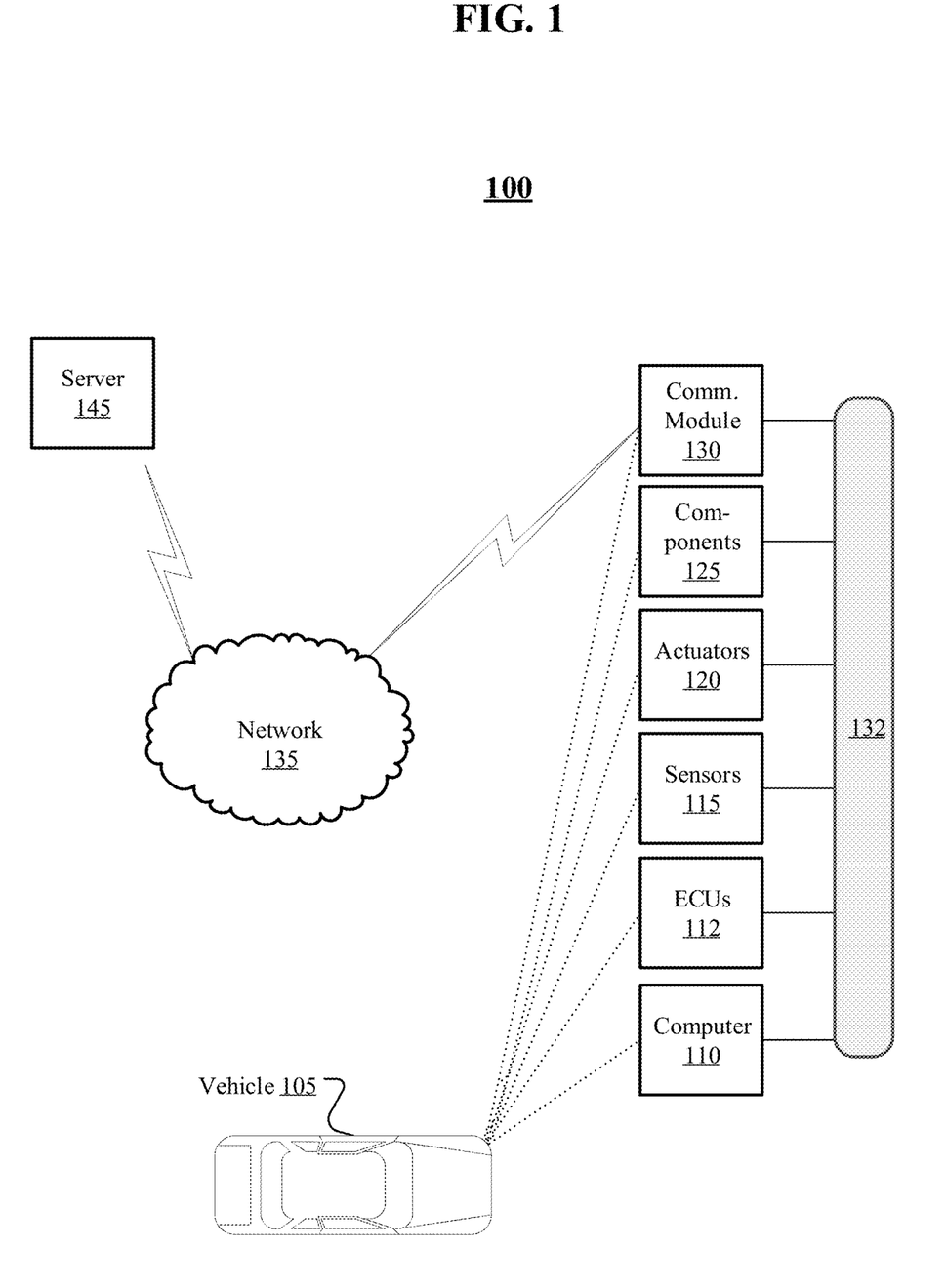
FIG. 1 is a block diagram of a first example system.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
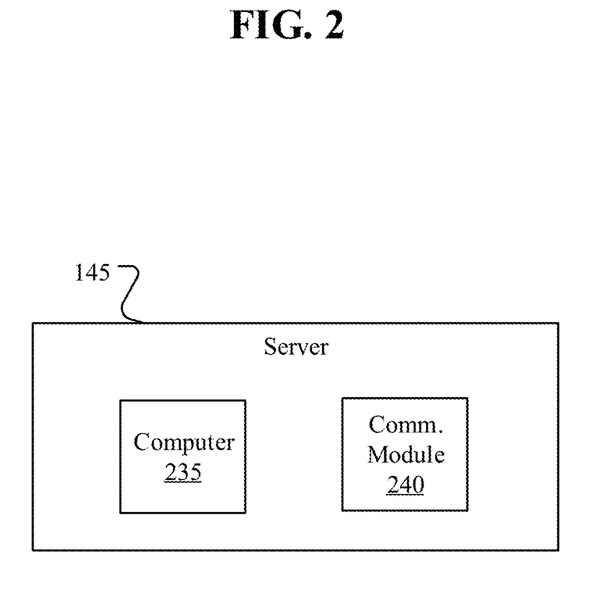
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
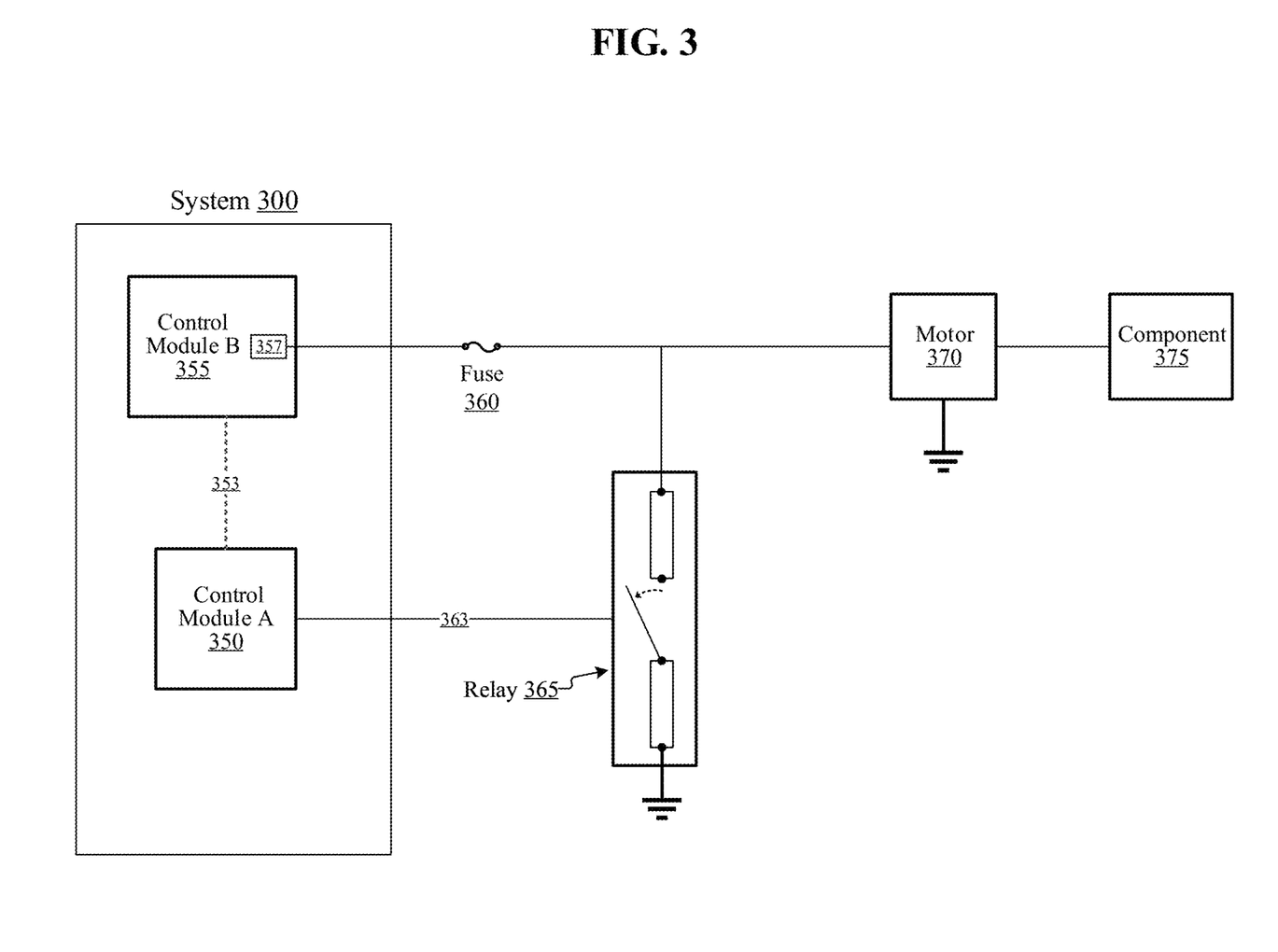
FIG. 3 is a block diagram of a second example system.

FIG. 3 is a block diagram of an example system 300 for actuation of an vehicle component using two control module. In the example depicted in FIG. 3, system 300 is arranged to use a motor 370 (e.g., an actuator 120 in FIG. 1) to actuate a component 375 (e.g., a component 125 in FIG. 1) of a vehicle (e.g., vehicle 105 in FIG. 1). System 300 includes a Module A 350 and a Module B 355. One Module is designed for actuation and the other for actuation logic Component 375 is a vehicle component that can be actuated, and that is of a type/classification for which controlling modules are subject to specified operational criteria. In some implementations, component 375 can be a retractable pedal. For example, in some implementations, component 375 can be a retractable brake pedal, accelerator pedal, or clutch pedal in a vehicle capable of both manual operation and autonomous and/or semi-autonomous operation. In some implementations, component 375 can be an emergency brake or parking brake.

That a control module 350 has operational criteria controlling actuation. The specified operational criteria can be criteria, software/hardware criteria for control modules intended to control components. For example, if component 375 is an emergency brake, Module A 350 can be a control module that meets operational criteria intended to control emergency brakes.

Control Module A 350 and Control Module B 355 can communicate with each other via a communication link 353. In some implementations, communication link 353 Module A 350 and Control Module B 355 (e.g., a wired connection between respective communication ports of the two control modules). In other implementations, communication link 353 can represent communicative connectivity via a communication network (e.g., vehicle network 132 of FIG. 1) with which both control modules are connected.

Control Module A 350 is electrically coupled with a relay 365 by a connection 363. Connection 363 can be a wire, a trace, or another type of connection capable of conveying signals. Control Module A 350 can control the state of relay 365 (i.e., open and close relay 365) by sending signals to relay 365 via connection 363. In some implementations, such signals can take the form of voltages applied to an input of relay 365. For example, in a given implementation, Control Module A 350 may apply a high voltage to an input of relay 365 in order to open relay 365, and may apply a low voltage to the input of relay 365 in order to close relay 365. In other implementations, Control Module A 350 can control the state of relay 365 by sending signals of other types or forms, such as modulated carrier waves.

Control module B 355 includes a power output 357, which is electrically coupled to motor 370 via a fuse 360. When closed, relay 365 couples power output 357 to ground via fuse 360. Control Module B 355 can deliver power to motor 370 via power output 357 in order to actuate component 375. As Control Module B 355 delivers power to motor 370 via power output 357, current will pass through fuse 360. Fuse 360 can be selected so that its electrical current rating or capacity accommodates the expected current demands associated with powering motor 370.

Actuating component 375 can change the operating state of component 375 by causing component 375 (or portions thereof) to move. For example, if component 375 is a retractable pedal, actuating component 375 can transition component 375 from a non-retracted state (in which it is operable) to a retracted state (in which it is inoperable), or vice versa. In another example, if component 375 is an emergency brake or parking brake, actuating component 375 can transition component 375 from an unengaged state (in which it does not resist vehicle motion) to an engaged state (in which it resists vehicle motion), or vice versa.

While Control Module B 355 is not delivering power via power output 357, no current (or negligible current) may flow through fuse 360. If Control module B 355 delivers power via power output 357 while relay 365 is open, an amount of current corresponding to that needed to power motor 370 passes through fuse 360. Control Module B 355 attempts to power motor 370 while relay 365 is closed, a large amount of current may flow from power output 357, and through fuse 360 and relay 365, to ground. This large amount of current may overload fuse 360 and cause it to blow, creating an open circuit between power output 357 of Control Module B module 355 and motor 370. This condition can prevent Control module B 355 from actuating component 375. By selectively operating switch 365 so that it is open when actuation of component 375 is desired and closed when actuation of component 375 is not desired, Control Module A 350 can prevent Control Module B 355 from performing undesired actuation of component 375 (such as could otherwise result from a malfunction of Control Module B 355, for example).

In order to establish as a "default" a condition according to which Control Module B 355 is unable to actuate component 375, a normally-closed relay can be used to implement relay 365. When relay 365 is a normally-closed relay, action (to open relay 365) on the part of Control Module A 350 is required before Control Module B control module 355 can become capable of actuating component 375.

During ordinary operation of a vehicle containing system 300, Control Module A 350 may determine (e.g., based on a signal received from a vehicle computer such as computer 110 of FIG. 1, based on a signal received from another external device, based on information received from sensors such as sensors 115 of FIG. 1, based on expiration of a timer, etc.) that component 375 is to be actuated. Responsive to this determination, Control Module A 350 can send a first signal to open relay 365. In some implementations, sending the first signal can involve applying a particular voltage or voltage level to an input of relay 365. In other implementations, the first signal can be of another type/form.

After sending the first signal to open relay 365, Control Module A 350 can send a second signal to cause Control Module B control module 355 to power motor 370. In some implementations, the second signal can be a message that Control Module A 350 sends to Control Module B control module 355 via a vehicle bus or other vehicle network (e.g., vehicle network 132 of FIG. 1). In some implementations, Control Module A 350 can wait for a defined amount of time (e.g., 20 ms) after sending the first signal before sending the second signal.

Responsive to receipt of the second signal, Control Module B control module 355 can begin outputting power from power output 357 to motor 370, causing current to pass through fuse 360. Fuse 360 can be implemented using a fuse with a high enough current rating to accommodate this current. Control Module B control module 355 can send a response to Control Module A 350 that indicates that actuation of component 375 is underway. Once actuation of component 375 is complete, Control Module B control module 355 can stop outputting power from power output 357. Control Module B control module 355 can also send a confirmation to Control Module A 350 that indicates that actuation of component 375 is complete. In some implementations, one or both of the response and the confirmation that Control Module B control module 355 sends to Control Module A 350 can be a message sent via a vehicle bus or other vehicle network (e.g., vehicle network 132 of FIG. 1).

After sending the second signal to Control Module B control module 355, Control Module A 350 can await receipt of a third signal comprising the confirmation by Control Module B control module 355 that actuation of component 375 is complete. Responsive to receiving this third signal, Control Module A 350 can send a fourth signal to close relay 365. In some implementations, sending the fourth signal can involve applying a particular voltage or voltage level to the input of relay 365. In other implementations, the fourth signal can be of another type/form.

Figure 4:
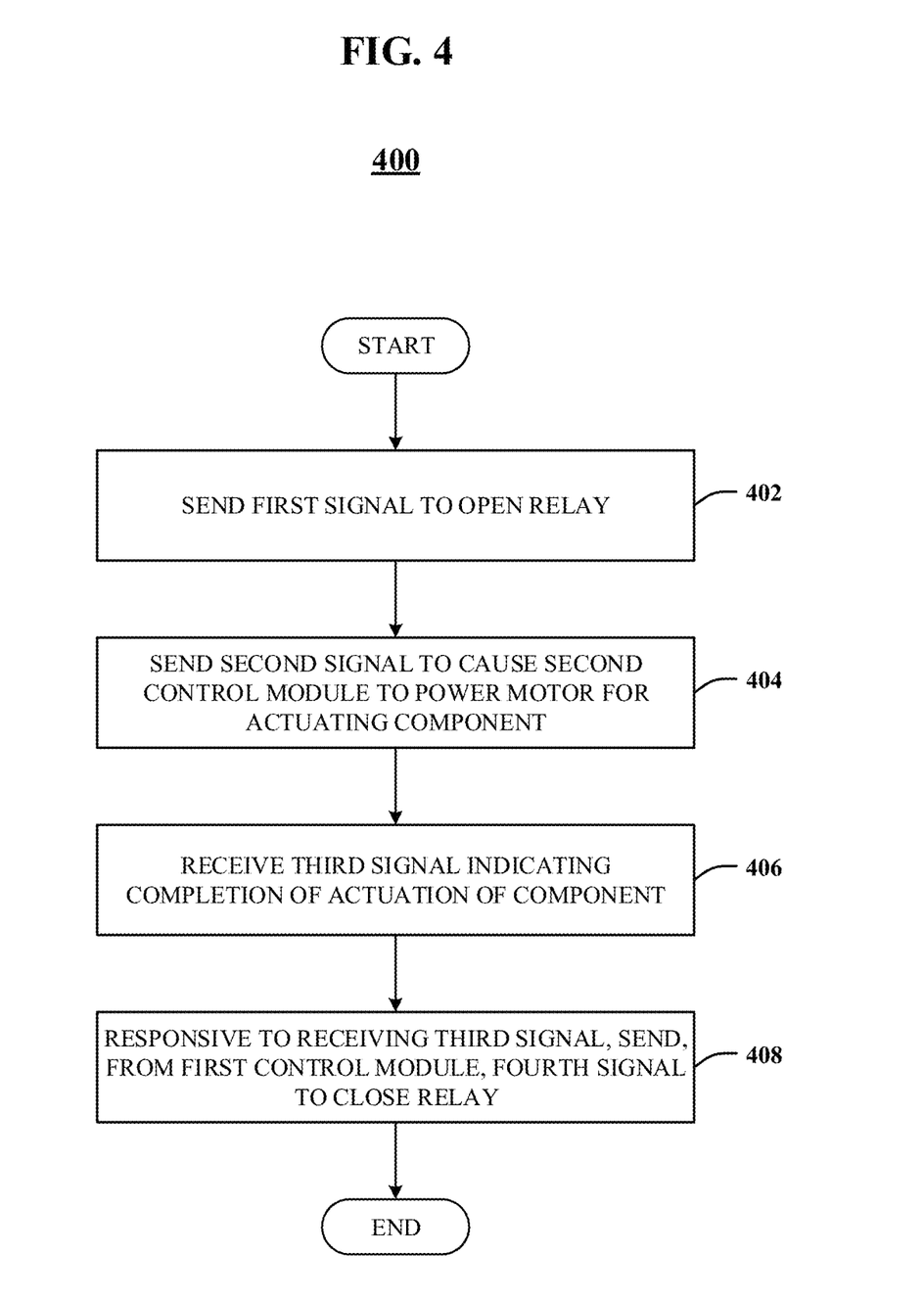
FIG. 4 is a block diagram of an example process flow.

FIG. 4 is a block diagram of a process flow 400 for actuation of a vehicle component using a Control Module B control module. Process flow 400 can be representative of operations performed by Control Module A 350 of FIG. 3 according to various implementations. As shown in FIG. 4, a first signal may be sent at 402 from a first control module of a vehicle to open a relay, and the first control module meets operational criteria for controlling a component of the vehicle. For example, Control Module A 350 of FIG. 3 may meet specified operational criteria for controlling component 375, and may send a signal in order to open relay 365.

At 404, a signal may be sent from the first control module to cause a second control module to power a motor for actuating the component, where the second control module meets operational criteria for actuation. For example, Control Module A 350 of FIG. 3 may send a signal to Control Module B control module 355 via communication link 353 to cause Control Module B control module 355 to power the motor 370 for actuating component 375.

At 406, a third signal may be received from the second control module that indicates completion of the actuation of the component. For example, Control Module A 350 of FIG. 3 may receive a signal from Control Module B control module 355 that indicates completion of the actuation of component 375.

At 408, responsive to receiving the third signal at 406, a fourth signal may be sent from the first control module to close the relay, and closing the relay may electrically couple a power output of the second control module to ground via a fuse. For example, responsive to receiving a signal from Control Module B control module 355 that indicates completion of the actuation of component 375, Control Module A 350 of FIG. 3 may send a signal in order to close relay 365, and closing relay 365 may electrically couple power output 357 of Control Module B control module 355 to ground via fuse 360.

Figure 5:
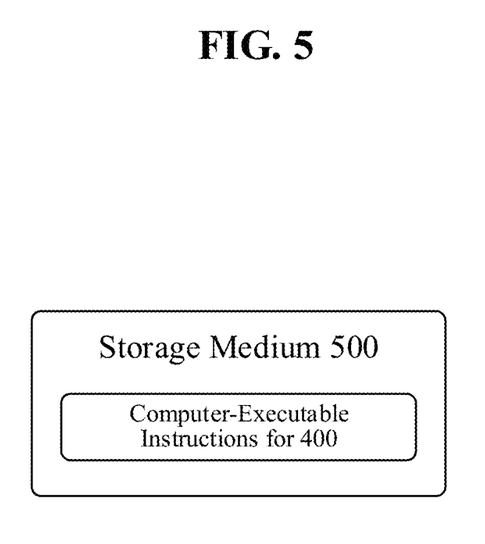
FIG. 5 is a block diagram of an example storage medium.

FIG. 5 illustrates an example storage medium 500. Storage medium 500 may be any non-transitory computer-readable storage medium or machine-readable storage medium, such as an optical, magnetic or semiconductor storage medium. In various implementations, storage medium 500 may be an article of manufacture. In some implementations, storage medium 500 may store computer-executable instructions, such as computer-executable instructions to implement process flow 400. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
   a first control module that meets operational criteria for controlling a component of a vehicle; and
   a second control module that meets operational criteria for actuating the component;
   wherein the first control module is arranged to:
   send a first signal to open a relay that, when closed, electrically couples a power output of the second control module to ground via a fuse;
   send a second signal to cause the second control module to power a motor for actuating the component;
   receive a third signal indicating a completion of actuation of the component; and
   responsive to receiving the third signal, send a fourth signal to close the relay.

2. The system of claim 1, wherein the first control module is arranged to wait for a defined amount of time after sending the first signal before sending the second signal.

3. The system of claim 1, wherein the relay is a normally-closed relay.

4. The system of claim 1, wherein the component comprises a retractable pedal.

5. The system of claim 4, wherein actuating the component causes the retractable pedal to move from a retracted position to a non-retracted position.

6. The system of claim 4, wherein actuating the component causes the retractable pedal to move from a non-retracted position to a retracted position.

7. The system of claim 4, wherein the retractable pedal is a brake pedal.

8. The system of claim 4, wherein the retractable pedal is an accelerator pedal.

9. The system of claim 4, wherein the retractable pedal is a clutch pedal.

10. The system of claim 1, wherein the component comprises an emergency brake or parking brake of the vehicle.

11. A method, comprising:
    sending, from a first control module of a vehicle, a first signal to open a relay, wherein the first control module is-meets specified operational criteria for controlling a component of the vehicle;
    sending, from the first control module, a second signal to cause a second control module of the vehicle to power a motor for actuating the component, wherein the second control meets specified operational criteria for controlling the component;
    receiving, from the second control module, a third signal indicating a completion of actuation of the component; and
    responsive to receiving the third signal, sending, from the first control module, a fourth signal to close the relay, wherein closing the relay electrically couples a power output of the second control module to ground via a fuse.

12. The method of claim 11, comprising waiting for a defined amount of time after sending the first signal before sending the second signal.

13. The method of claim 11, wherein the relay is a normally-closed relay.

14. The method of claim 11, wherein the component comprises a retractable pedal.

15. The method of claim 14, wherein actuating the component causes the retractable pedal to move from a retracted position to a non-retracted position.

16. The method of claim 14, wherein actuating the component causes the retractable pedal to move from a non-retracted position to a retracted position.

17. The method of claim 14, wherein the retractable pedal is a brake pedal.

18. The method of claim 14, wherein the retractable pedal is an accelerator pedal.

19. The method of claim 14, wherein the retractable pedal is a clutch pedal.

20. The method of claim 11, wherein the component comprises an emergency brake or parking brake of the vehicle.

* * * * *

UNITED STATES PATENT AND TRADEMARK OFFICE
CERTIFICATE OF CORRECTION

| | |
|---|---|
| PATENT NO. | : 12,030,444 B2 |
| APPLICATION NO. | : 17/352882 |
| DATED | : July 9, 2024 |
| INVENTOR(S) | : Scott J. Lauffer et al. |

It is certified that error appears in the above-identified patent and that said Letters Patent is hereby corrected as shown below:

In the Claims

Claim 11, Column 10, Line 11 replace "is-meets specified operational criteria" with "--meets specified operational criteria--"

Signed and Sealed this
Sixth Day of August, 2024

Katherine Kelly Vidal
*Director of the United States Patent and Trademark Office*